United States Patent [19]
Fetzer

[11] Patent Number: 5,471,739
[45] Date of Patent: Dec. 5, 1995

[54] REMOTE CLAMP CONNECTOR

[75] Inventor: Kelly D. Fetzer, Houston, Tex.

[73] Assignee: ABB Vetco Gray Inc., Houston, Tex.

[21] Appl. No.: 379,421

[22] Filed: Jan. 27, 1995

[51] Int. Cl.⁶ .................................................. B23Q 15/00
[52] U.S. Cl. ............................... 29/705; 29/714; 29/237; 29/238; 29/239
[58] Field of Search .......................... 29/237, 238, 239, 29/272, 705, 707, 708, 714; 269/43, 329

[56] References Cited

U.S. PATENT DOCUMENTS

3,603,617  9/1971  Lochridge .
3,717,920  2/1973  Oliver et al. .
4,477,205  10/1984  Morrill et al. .
4,569,539  2/1986  Creedon .
4,832,530  5/1989  Andersen et al. .................. 29/237
5,386,622  2/1995  Susaki et al. ...................... 29/714

Primary Examiner—David P. Bryant
Attorney, Agent, or Firm—James E. Bradley

[57] ABSTRACT

A remote clamp connector will connect and disconnect hubs of abutting pipes. The connector has a clamp with segments which will pivot outward and inward for engaging external flanges of the hubs of the pipes. A remotely actuated drive member moves the clamp between closed and open positions. A carriage supports the clamp. The carriage is retractable along the pipe after the hub has moved to the open position.

19 Claims, 9 Drawing Sheets

REMOTE CLAMP CONNECTOR

BACKGROUND OF THE INVENTION

1. Field of the Invention

This invention relates in general to clamps for clamping two pipes together in a abutting engagement, and in particular to the clamp that is remotely actuated.

2. Description of the Prior Art

In some installations, pipes have to be disconnected frequently under potentially hazardous conditions. For example, in a plant that manufactures coke, the feed pipe to the bottom lid of a coking drum transmits oil and steam into the coking drum, which through heat and pressure creates coke. The feed pipe has to be disconnected normally on a daily basis to lower the lid for removing the coke. This can be a hazardous operation as the feed pipe may still contain hot material, and steam, dust and other debris may spew out once the disconnection is made.

The connecting joint in the feed pipe is normally a type having abutting flanged hubs. In some installations, the connecting joint uses bolts passing through the flanges, thus has to be disconnected by loosening the bolts with a wrench. This procedure exposes the workers to the heat and debris. Also, it is a time consuming process. Another type of prior art joint uses a hinged clamp. The clamp has three segments which fit around the abutting hubs of the pipes and engage the external flanges. When moved to the closed position, the segments of the clamp pull the hubs together to form the connection. A threaded rod is rotated to open and close the clamp segments. While this clamp type of pipe joint is opened faster than flange bolts, in some installations, workers are exposed to contents of the pipe while opening the clamp.

The clamp type connector has been also used in remote operations wherein a worker will stand behind a wall and extend a long tool through a hole in a wall to engage the threaded rod of the clamp to unscrew it. While this removes the worker from the hazardous area for the initial opening of the clamp, it can be time consuming. Also, workers still need to be present at times to pull the pipes apart from each other.

SUMMARY OF THE INVENTION

In this invention, the pipes are disconnected and connected by true remote operation. The pipes have abutting hubs which have flanges and mating faces. A segmented clamp extends around the hubs, and when moved to the closed position, draws the hubs in tight engagement with each other. The clamp moves from the closed to the open position by a remotely actionable power driven means. The clamp is mounted to a carriage which has a retraction means which will move the carriage and the clamp longitudinally away from the hubs after the clamp has been moved to the open position.

In the preferred embodiment, the carriage mounts on rollers which roll on one of the pipes between the extended and retracted positions. Also, preferably, a pipe moving means will retract one of the pipes from the other after the carriage has been retracted. A temperature sensing means senses the temperature of the pipes and prevents opening operation of the clamp until the temperature has cooled to a safe level. Sensors on the clamp prevent the retracting mechanism from operating until the clamp is in the fully open position. Preferably, one of the hubs has a box member which defines a recess for telescopingly receiving a pin member from the other hub.

DETAILED DESCRIPTION OF THE INVENTION

Figures 2, 3:
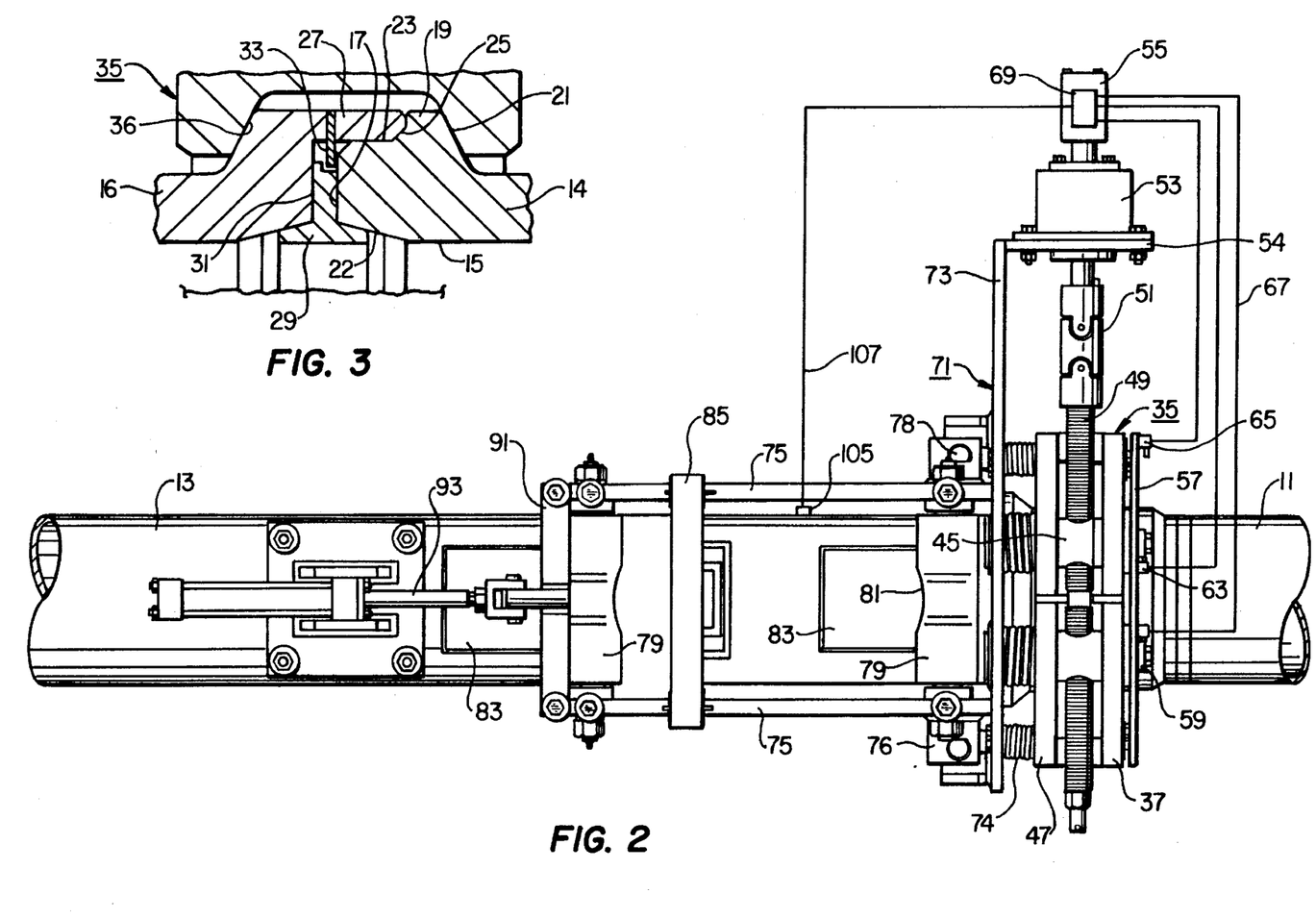
FIG. 2 is a top plan view of the remote clamp connector of FIG. 1.
FIG. 3 is an enlarged sectional view of a portion of the hubs of the pipes being connected in FIG. 1.

Referring to FIG. 3, the preferred connection joint is shown in section. The connection joint is between two pipes 11, 13, each having a hub 14, 16 on its end. Each pipe 11, 13 has a bore 15, and when the pipes 11, 13 are connected as shown FIG. 3, the longitudinal axis of bore 15 will be common to both pipes 11, 13. Each hub 14, 16 has a face 17 that is a flat surface perpendicular to the axis. Also, each hub 14, 16 has an external flange 19 which has a conical make-up shoulder 21. Conical seal surfaces 22 are formed at the intersection of each bore 15 with each face 17.

Hub 14 has a pin member 23 in the preferred embodiment, defined by a cylindrical surface extending circumferentially at the perimeter of face 17. Pin member 23 protrudes past flange 19 and has face 17 on its end. Hub 16 has a box member 27 formed by a circumferential wall that slidingly and telescopingly receives pin number 23. Box member 27 extends past the face 17 of hub 16, defining a recess for receiving pin member 23. The interior cylindrical surface of box member 27 is smooth and slidingly engages the cylindrical exterior surface of pin member 23. Mating tapered surfaces 25 in the box member 27 and on pin member 23 provide alignment, allowing pipes 11, 13 to be misaligned prior to insertion.

A metal seal 29 locates between the faces 17 of hubs 14, 16. Seal 29 is generally T-shaped, having conical seal surfaces on its outer side that engage mating conical seal surfaces 22 in the bores 15 of hubs 14, 16. Seal 29 has a rib 31 that extends radially outward from the longitudinal axis and locates between the faces 17. A plurality of pins 33 (only one shown) secured to box member 27 extend radially inward and engage a recess on the perimeter of rib 31. Pins 33 retain seal 29 with hub 16 when the pipes 11, 13 are disconnected.

Figure 4:
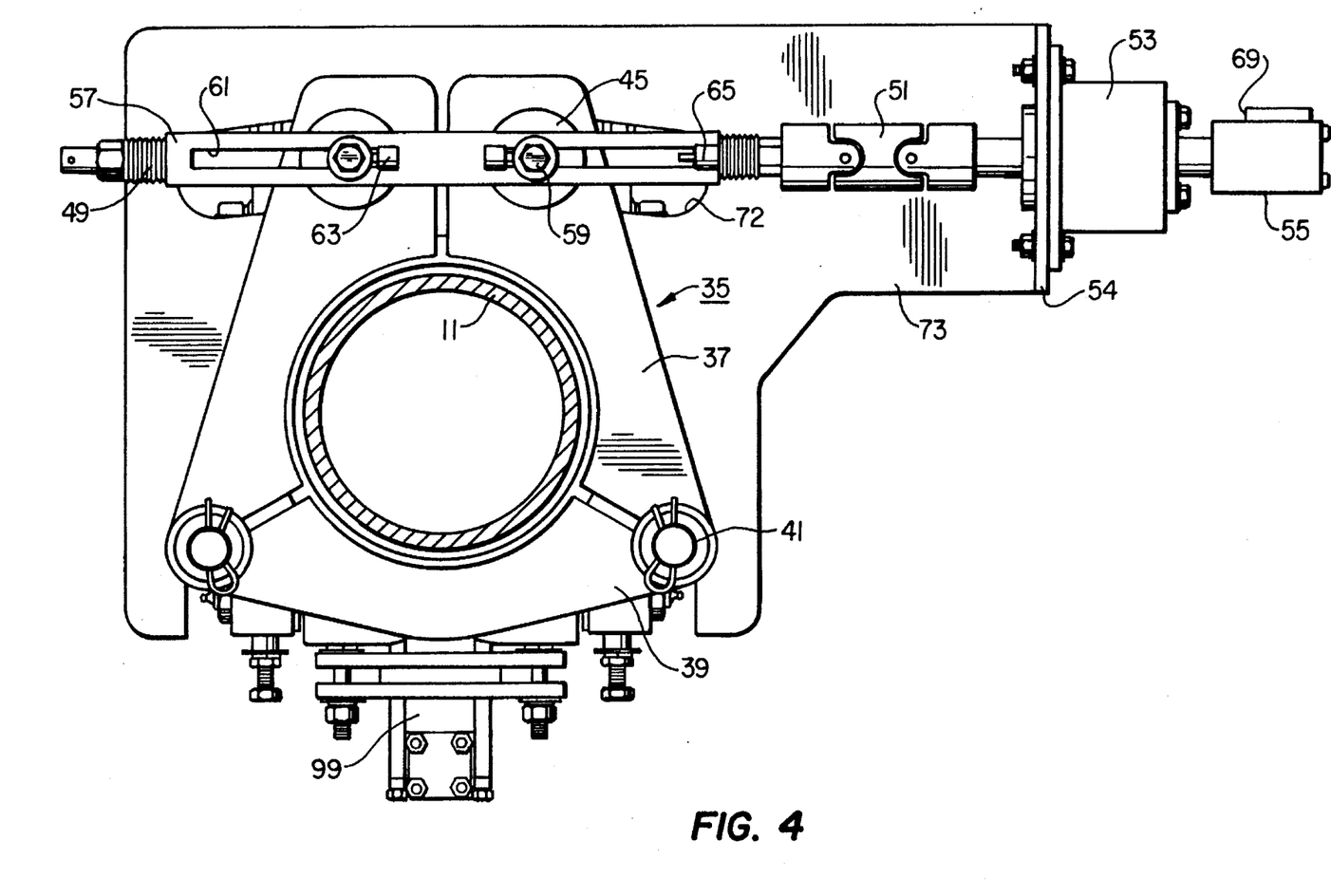
FIG. 4 is an end view of the remote clamp connector of FIG. 1, showing the clamp in a closed position.

A clamp 35 secures the hubs 14, 16 tightly together with seal 29 located between. Clamp 35 has interior wedge surfaces 36 that are at the same taper as conical shoulders 21 for engaging shoulders 21. Moving clamp 35 radially inward toward the longitudinal axis tightly forces the hubs 14, 16 together. Referring to FIG. 4, clamp 35 is segmented, having two upper segments 37 and a lower segment 39. Pivot pins 41 connect the upper segments 37 to the lower segment 39 to allow the clamp 35 to move between the closed position shown in FIG. 4 to the open position shown in FIG. 6.

Figure 1:
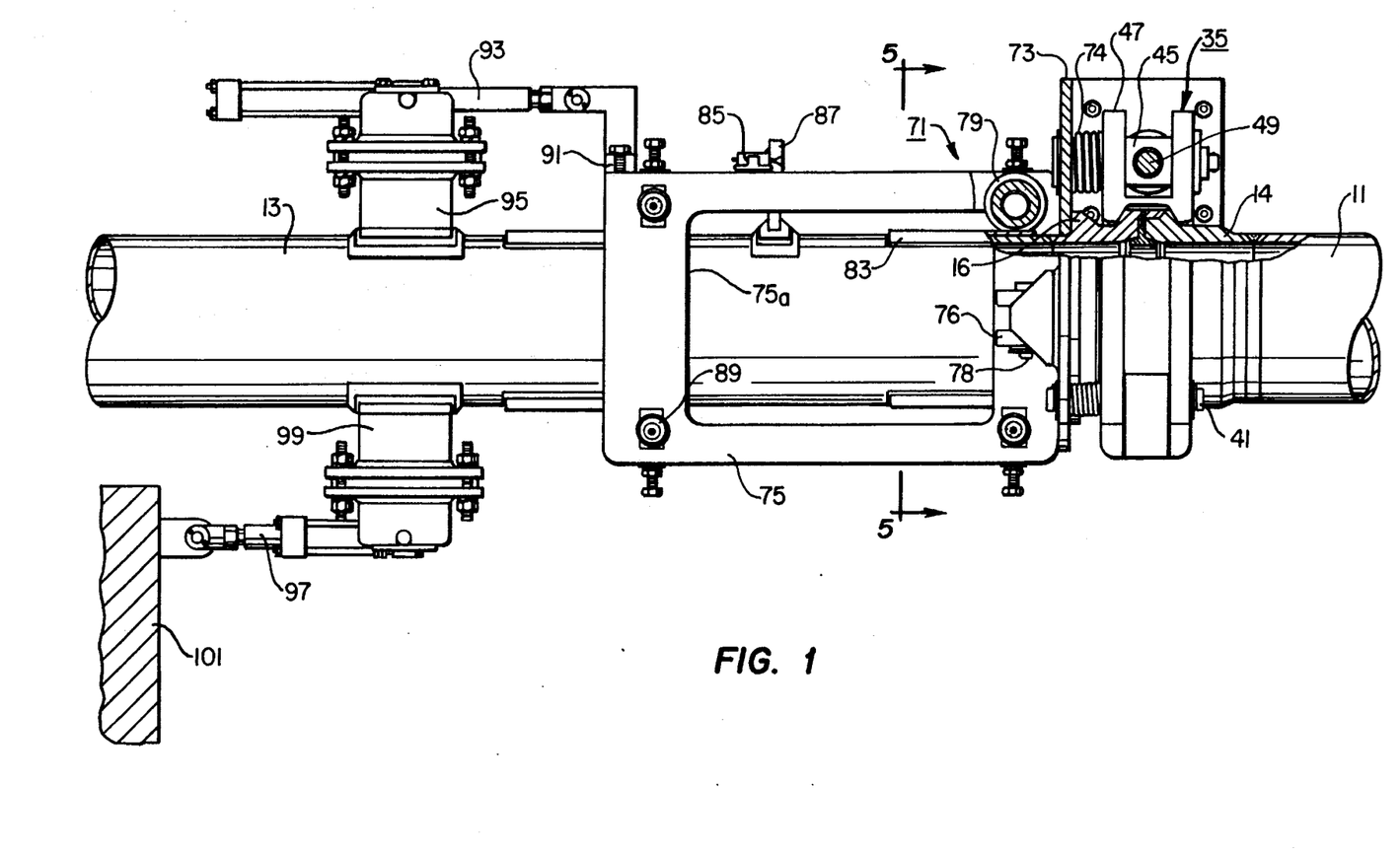
FIG. 1 is a side elevational view, partially sectioned, showing a remote clamp connector constructed in accordance with this invention.
Figure 6:
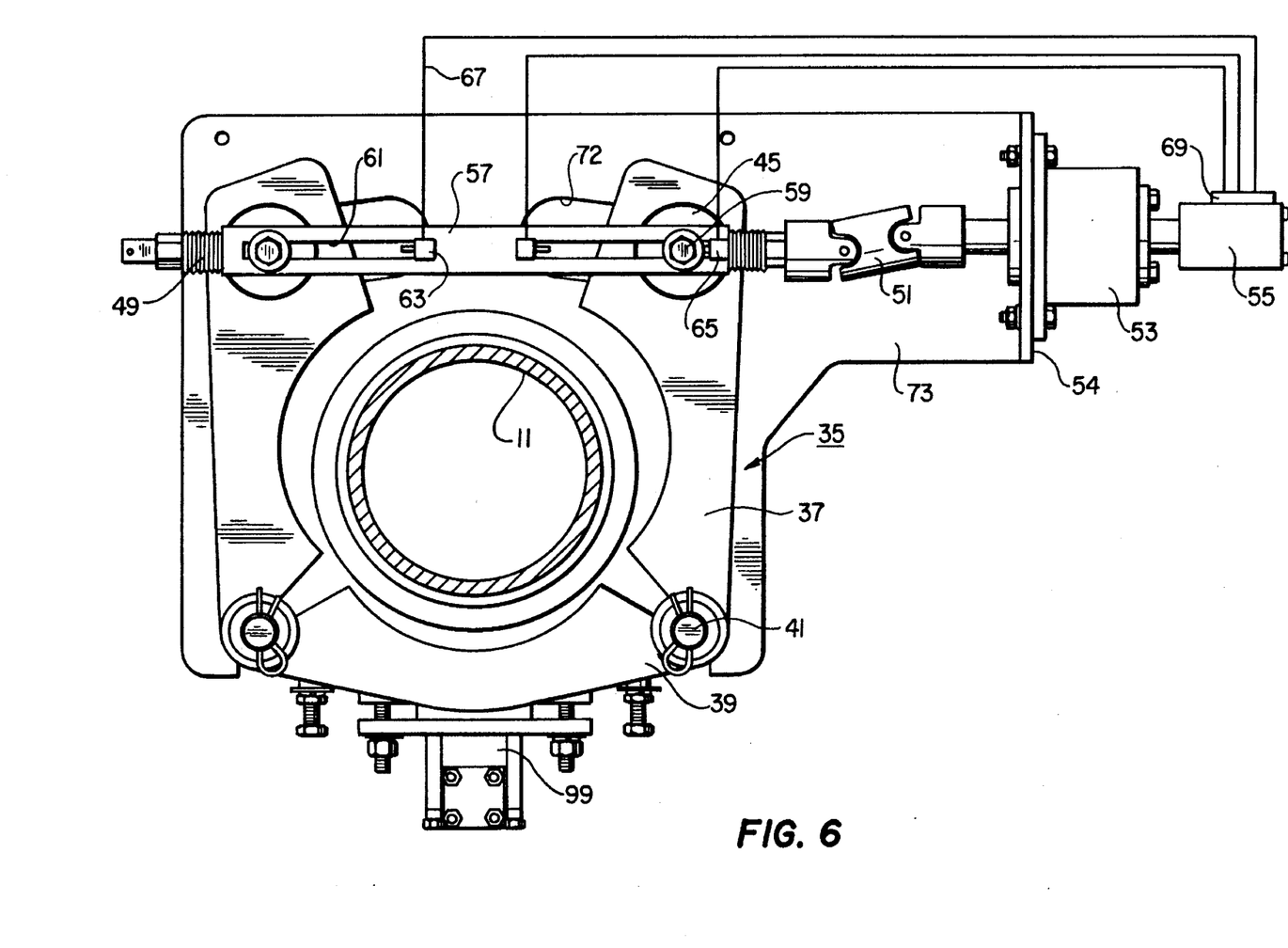
FIG. 6 is another end view of the remote clamp connector as shown in FIG. 4, but showing the clamp in an open position.

A remotely actuated drive mechanism moves the clamp segments 37, 39 between the closed and open positions. The drive mechanism includes a pair of trunions 45. Trunions 45 comprises cylindrical members rotatably mounted to the upper segments 37, as shown in FIGS. 1 and 2. The upper segments 37 have forward and rearward parallel plates 47 separated from each other by a space where the trunions 45 locate. A threaded rod 49 extends between plates 47 through threaded holes in the trunions 45, as shown in FIGS. 1 and 2. Rotating threaded rod 49 in one direction will cause the trunions 45 to move toward each other to close the clamp 35, while rotating threaded rod 49 in the other direction will move trunions 45 apart from each other to open clamp 35. As shown in FIGS. 2, 4 and 6, a U-joint 51 connects threaded rod 49 to a transmission 53. Transmission 53 is bolted to a brace 54. A motor 55, which may either be electric or hydraulic, drives transmission 53. Motor 55 is used to rotate rod 49 in both directions.

Referring particularly to FIG. 4, a sensing means is employed to sense when the clamp 35 is in the closed position and in the fully open position. The sensing means includes a track 57 which is a flat metal strip extending horizontally on the forward side of clamp 35. Track 57 has two elongated slots 61. Fasteners 59 are secured in threaded holes in trunions 45 and extend forward from the trunions 45. Fasteners 59 have heads that extend through slots 61. A closed position sensor 63 is located on the inner end of each of the slots 61 for engagement by the heads of fasteners 59 when clamp 35 is in the fully closed position. One open position sensor 65 is located at the outer end of one of the slots 61 for engagement by the head of one of the fasteners 59. In the embodiment shown, outer position sensor 65 is spring-biased so that it will not signal the fully open position until a sufficient force is applied to the plunger of sensor 65.

If the clamp segments 37 open unevenly, because of its spring-biased plunger, sensor 65 will not signal the fully open position even if contacted by fastener 59 until both fasteners 59 are at the outer ends of slots 61. Sensors 63, 65 may be any type of sensor for determining position, and preferably are limit switches. Sensors 63, 65 are connected by wires 67 (shown only in FIGS. 2 and 6) to a control circuit 69. Wires 67 could be hydraulic or electrical. Sensors 63 inform control circuit 69 when the clamp 35 is completely closed. Sensor 65 informs control circuit 69 when both of the upper segments 37 are completely opened.

Figure 7:
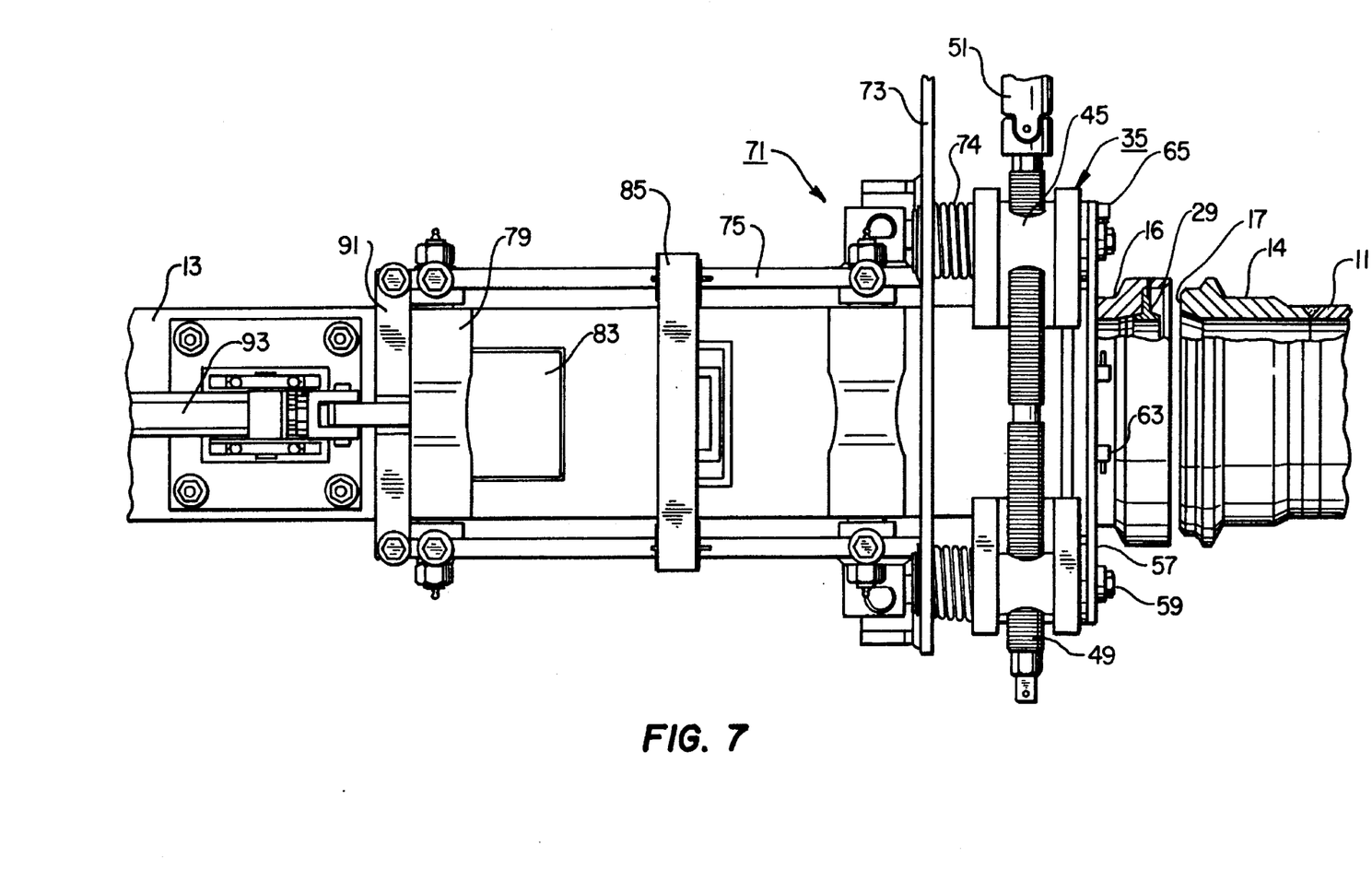
FIG. 7 is a partial top plan view of the clamp connector FIG. 1, showing the clamp connector in a retracted position.

Referring now to FIG. 1, clamp 35 is supported by a retractable carriage 71. Carriage 71 includes a back plate 73. Back plate 73 is oriented perpendicular to the longitudinal axis of pipes 11, 13 and supports transmission brace 54. The trunions 45 extend through elongated slots 72 (FIG. 6) formed in open-ended back plate 73. Pivot pins 41 extend through elongated slots in back plate 73. Springs 74 surround the trunions 45 and the pivot pins 41, and are compressed between the clamp 35 and back plate 73. Springs 74 allow compliance movement of clamp 35 relative to back plate 73. Back plate 73 has an elongated slot through which pipe 13 extends. Back plate 73 abuts a portion of hub 16 when in an extended position, as shown in FIG. 1, and slides away from hub 16 on pipe 13 when in the retracted position as shown in FIG. 7.

Figure 5:
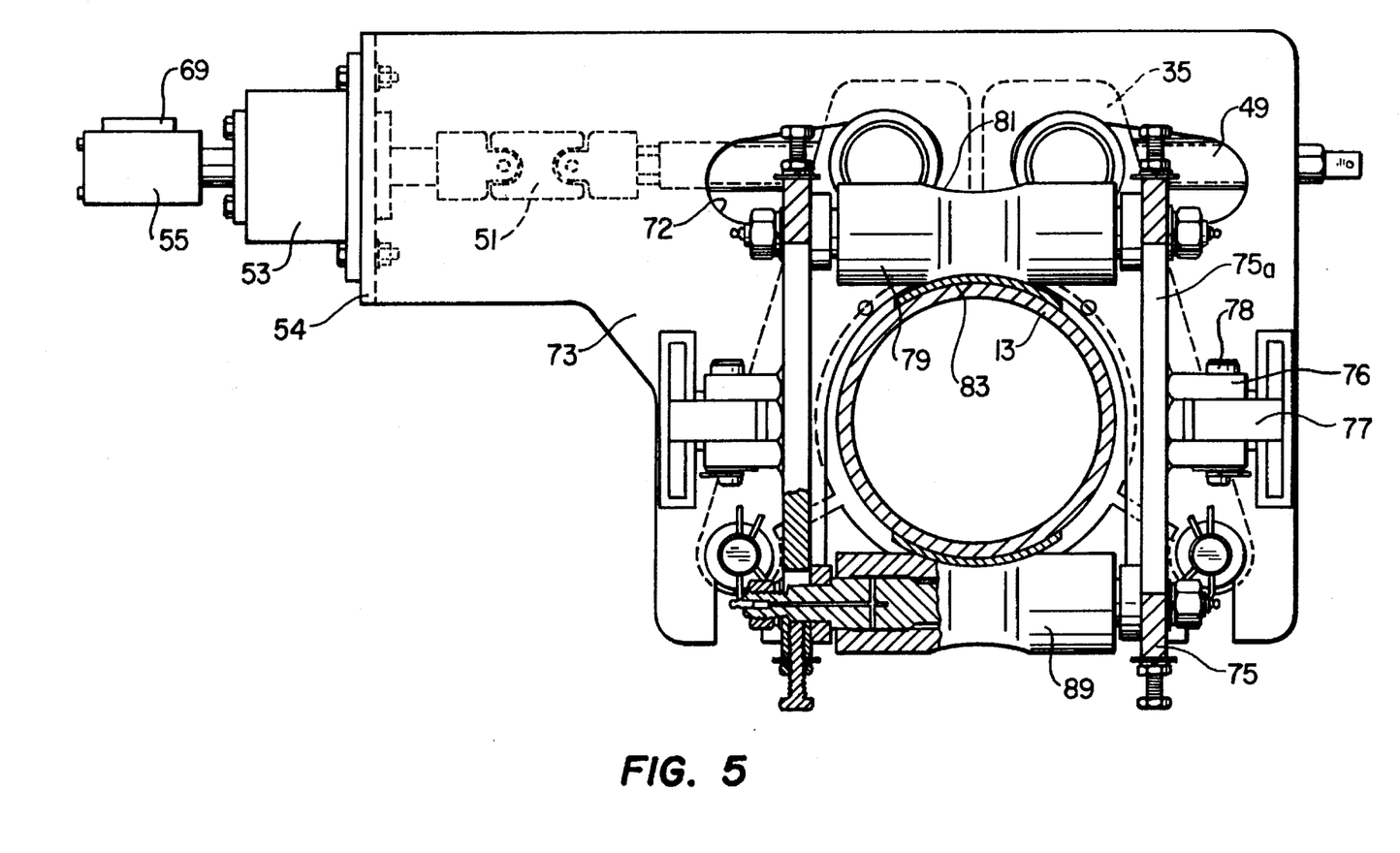
FIG. 5 is a sectional view of the remote clamp connector of FIG. 1, taken along the line V—V of FIG. 1.

A pair of side plates 75 extend rearward from back plate 73. Side plates 75 are perpendicular to back plate 73 and located on each side of pipe 13. Each side plate 75 has a rectangular hole 75a therein for weight reduction. As shown in FIG. 5, side plates 75 are mounted to back plate 73 for quick disconnection for maintenance. The mounting attachment includes a pair of flanges 76 on each side plate 75 that receive a lug 77. The flanges 76 are welded to the side plate 75, while lug 77 is welded to back plate 73. A pin 78 extends through mating holes in flanges 76 and lug 77. Removing pin 78 allows carriage 71 to be pulled rearward relative to back plate 73.

Referring to FIGS. 2 and 5, a pair of upper rollers 79 are rotatably mounted to side plates 75. Rollers 79 extend between side plates 75 and will rotate relative to side plates 75. Each upper roller 79 has a concave central section 81 for rolling on a curved wear plate 83. Wear plates 83 are welded to the top of pipe 13. A stabilizing brace 85 extends transversely across the upper edges of the side plates 75. Stabilizing brace 85 is rigidly mounted to pipe 13 by a vertical brace support 87 (FIG. 1). Stabilizing brace 85 remains stationary during retraction of carriage 71 and slidingly engages the upper edges of side plates 75. Stabilizing brace 85 prevents the clamp assembly 35 from rotating around pipe 13.

Referring again to FIG. 5, a pair of lower rollers 89 are mounted below pipe 13 between side plates 75. Lower rollers 89 are identical to upper rollers 79 and engage similar wear plates. Upper rollers 79 and lower rollers 89 allow the carriage 71 and clamp 35 to smoothly move between a retracted position shown in FIG. 7 and an extended position shown in the other figures.

The means to move carriage 71 and clamp 35 between the retracted and extended positions includes a brace 91 shown in FIG. 2. Brace 91 rigidly connects side plates 75 at the rearward ends and upper edges. A hydraulic cylinder 93 is connected to brace 91. The hydraulic cylinder 93 is mounted to a support 95 which is welded to pipe 13. Stroking hydraulic cylinder 93 will cause the retraction and extension of carriage 71 and clamp 35. The amount of retraction travel is about five inches.

It is also necessary to move pipes 11, 13 apart from each other because of the telescoping engagement of box member 27 with pin member 23, illustrated in FIG. 3. This can be handled by a variety of means. In FIG. 1 the pipe moving means is shown including a pipe moving hydraulic cylinder 97. Hydraulic cylinder 97 has one end mounted to a support 99 that is welded to pipe 13. The other end is mounted to a stationary structure 101. Stroking pipe moving cylinder 97 will cause pipe 13 to retract from pipe 11 a short distance, approximately one inch. This amount is sufficient to completely remove box member 27 from pin member 23.

Figure 8:
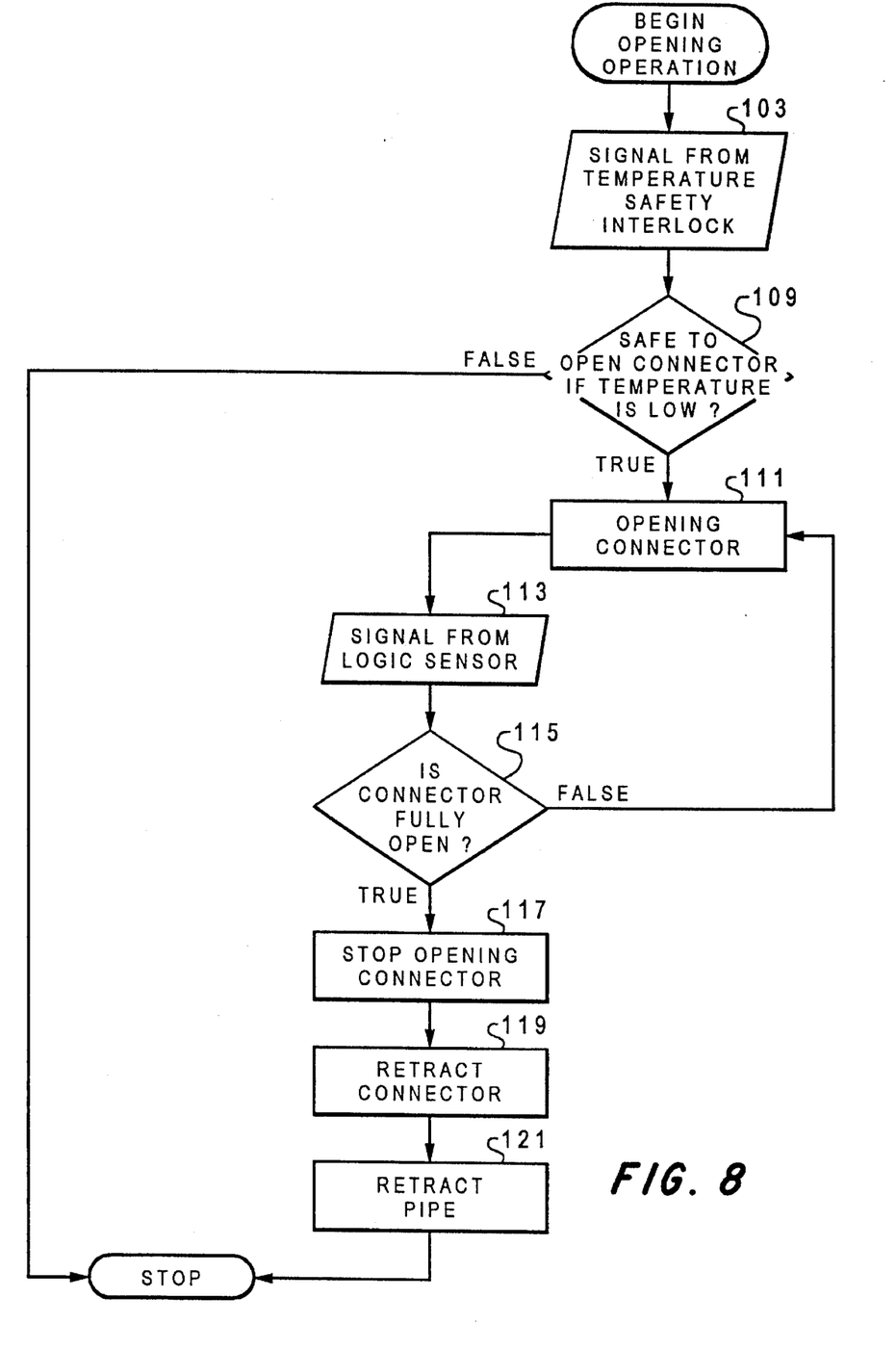
FIG. 8 is a flow chart illustrating the control system for opening the remote control clamp connector of FIG. 1.

Referring to FIG. 8, when the appropriate time to disconnect pipes 11, 13 occurs, the operator from a remote location will actuate a control signal switch which is connected to control circuit 69 (FIG. 2). The control circuit 69 will be monitoring a signal, indicated in step 103, indicating the temperature of pipes 11, 13 in the vicinity of hubs 14, 16. As shown in FIG. 2, the signal comes from a temperature sensor 105 connected by a wire 107 to control circuit 69. If the temperature is above a selected safe level, step 109 will prevent the opening operation. If below the safe maximum level, the opening operation continues. Step 111 supplies power to motor 55 (FIG. 2) to begin rotating threaded rod 49 in the proper opening direction. This opening movement occurs until a signal in the logic sensor, indicated by step 113, indicates that the clamp 35 is in the fully opened position shown in FIG. 6. Sensor 65 will signal control circuit 69 once both fasteners 59 have reached the outer ends of the slots 61, indicated by step 115. Once that occurs, step 117 indicates that motor 55 will be stopped.

Then, the operator from the remote location will actuate another switch to cause retraction, indicated by step 119. Control circuit 69 will signal a hydraulic pump (not shown) to supply hydraulic fluid to retract cylinder 93. Retract cylinder 93 then pulls carriage 71 and clamp 35 rearward as indicated by step 119 in FIG. 8. During the rearward movement, rollers 79 and 89 will roll on their respective wear plates 83. Stabilizing brace 85 will maintain carriage 71 in the desired horizontal orientation during this retraction movement. The retraction will pull clamp 35 to a position slightly rearward of the forwardmost edge of hub 16 as shown in FIG. 7.

Then, as indicated by step 121 in FIG. 8, the operator in the remote location will actuate a control switch to move the pipe 13 rearward. The control logic prevents movement of pipe 13 until carriage 71 has been fully retracted. Hydraulic fluid pressure will be supplied to pipe moving cylinder 97, which moves pipe 13 about one inch. Pipe 13 will move rearward until its forward edge is clear of face 17 of hub 14. Carriage 71 and clamp 35 will move with pipe 13 during this movement. Then, pipe 11 may be moved laterally relative to pipe 13 for removing the lid of the coking drum.

Figure 9:
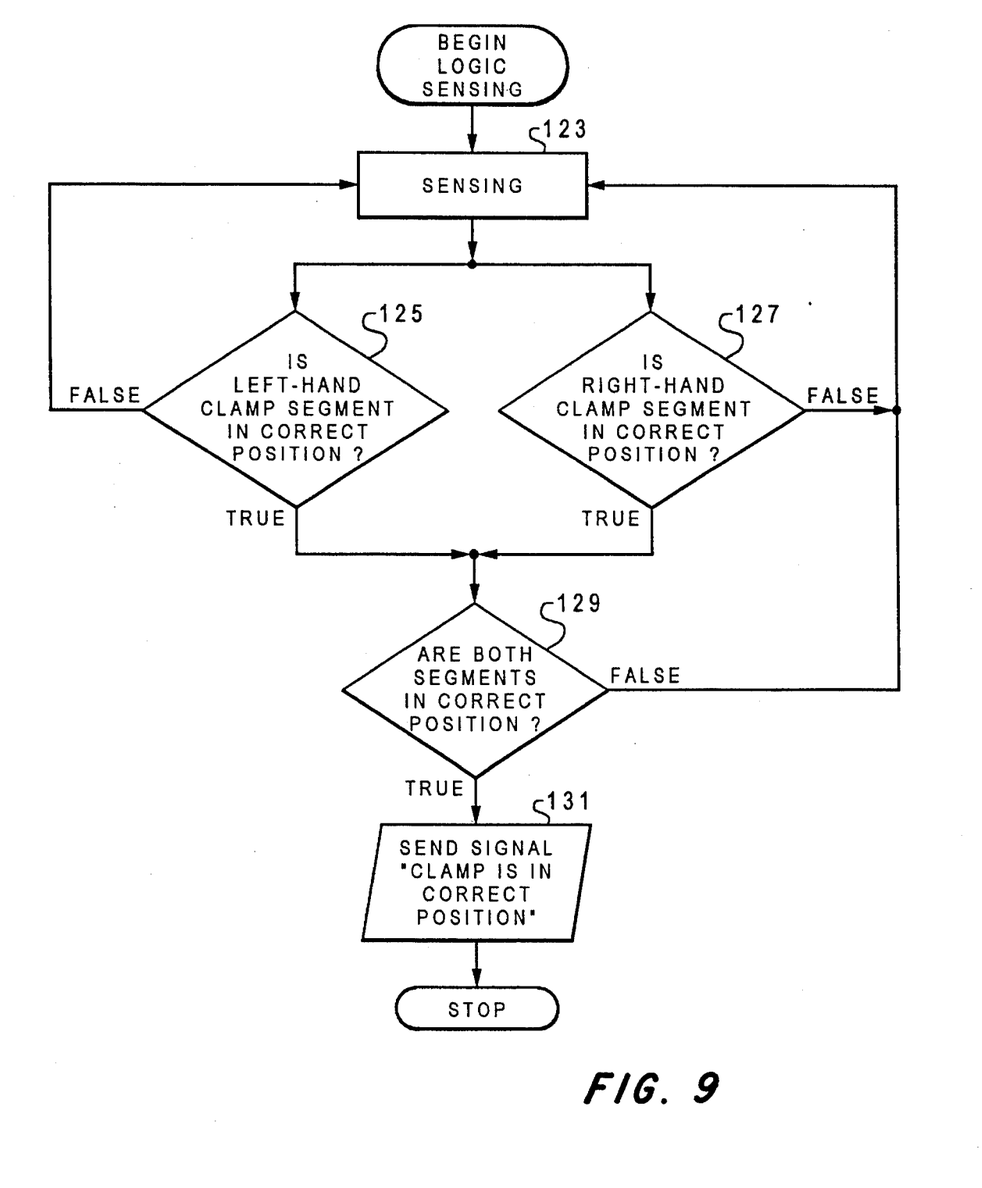
FIG. 9 is a flow chart illustrating a portion of the control system to determine whether or not the clamp is fully open before retracting.

FIG. 9 illustrates more details of the step 113 of FIG. 8. Step 123 indicates that sensing will begin once the motor 55 (FIG. 2) has began to rotate threaded rod 49. Steps 125, 127 will provide a signal once the plunger of sensor 65 (FIG. 4) is depressed by fastener 59. Step 129 indicates that control circuit 69 will then provide a signal 131 upon such occurrence.

Figure 10:
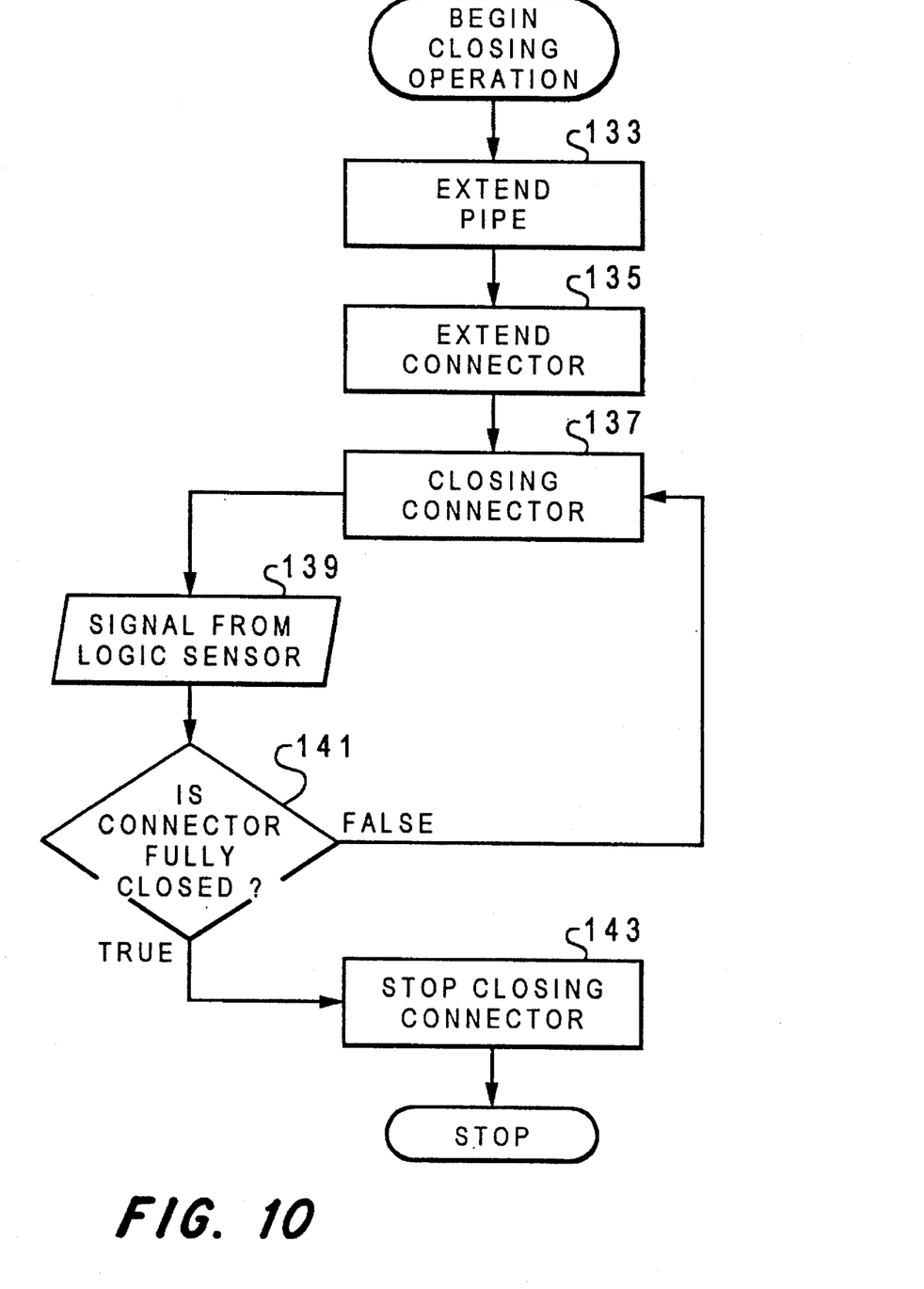
FIG. 10 is a flow chart illustrating the closing operation of the remote clamp connector.

To reconnect pipes 11, 13, the reverse is repeated. FIG. 10 illustrates the sequence of operations. First, step 133 will signal pipe moving cylinder 97 (FIG. 1) to move pipe 13 forward into telescoping engagement with pipe 11. Then, step 135 indicates that retraction cylinder 93 will be actuated to move carriage 71 and clamp 35 forward to the extended position. In the extended position, the clamp 35 will be spaced around the mating hub flanges 19. Step 137 indicates that the motor 55 (FIG. 2) will be actuated to rotate threaded rod 49 in the opposite direction to close the clamp 35. Step 139 indicates that this occurs until signals are received from both of the closed positions sensor 63 (FIG. 4). Step 141 indicates that when this has occurred, it will cause the motor 55 to stop operating.

The invention has significant advantages. The clamp is fully operable from a remote location, avoiding the need for personnel to be present in a hazardous environment. The clamp has safety features to prevent opening while the material within the pipe is still too hot. Safety features also prevent retraction of the clamp prior to the clamp being fully opened.

While the invention has been shown to only one of its forms, it should be apparent to those skilled in the art that it is not so limited, but is susceptible to various changes without departing from the scope of the invention. For example, the motor and threaded rod for opening and closing the clamp could be replaced with a hydraulic cylinder.

I claim:

1. An apparatus for remotely disconnecting two pipes from each other, each of the pipes having a hub with a face perpendicular to a longitudinal axis and an external flange, comprising in combination:

a clamp having at least two segments which pivot outward and inward relative to the longitudinal axis between an open position and a closed position engaging the external flanges to hold the faces of the hubs in abutment with each other;

a remotely actuable powered drive member for moving the clamp from the closed position to the open position;

a carriage mounted to the clamp; and remotely actuable retraction means for moving the carriage and the clamp longitudinally away from the hubs after the clamp has moved to the open position, to allow disconnection of the pipes from each other.

2. The apparatus according to claim 1, wherein the retraction means comprises at least one roller which rotatably engages one of the pipes.

3. The apparatus according to claim 1, further comprising:

sensing means for determining whether the clamp is fully in the open position, and for automatically preventing the retraction means from operating unless such has occurred.

4. The apparatus according to claim 1, further comprising:

temperature sensing means for monitoring the temperature of the pipes in the vicinity of the hubs and for preventing the drive member from opening the clamp if the temperature is above a selected temperature.

5. The apparatus according to claim 1, wherein the drive member comprises a threaded rod which is rotated to open and close the clamp.

6. The apparatus according to claim 1, wherein the retraction means comprises a hydraulic cylinder having one end attached to one of the pipes and another end attached to the carriage.

7. The apparatus according to claim 1, further comprising:

pipe moving means for moving one of the pipes longitudinally relative to the other of the pipes after the retraction means has retracted the carriage and the clamp.

8. The apparatus according to claim 1, wherein:

one of the hubs has a pin member protruding past the flange; and the other of the hubs has an annular box member extending past the face, defining a recess for receiving the pin member of the other of the hubs; and wherein the apparatus further comprises:

pipe moving means for moving one of the pipes longitudinally relative to the other of the pipes to withdraw the box member and pin member from each other after the retraction means has retracted the carriage and the clamp.

9. The apparatus according to claim 1, further comprising:

a seal comprising an annular metal ring which has a rib which locates between the faces and which has conical faces on an outer surface which engage mating conical seal surfaces formed in the hubs adjacent the faces; and the apparatus further comprises means for retaining the seal with one of the hubs after the pipes have been disconnected.

10. An apparatus for remotely disconnecting first and second pipes from each other, each of the pipes having a hub with a face perpendicular to a longitudinal axis and an external flange having a conical shoulder, the pipes being connectable to each other with the faces in abutment with each other and a seal located between, the apparatus comprising in combination:

a clamp having at least two segments pivotally mounted to each other for movement between a radially expanded open position and a radially contracted closed position, each of the clamp segments having a pair of wedge surfaces which engage the conical shoulders of the flanges;

a remotely actuable powered drive member for moving the clamp segments between the open position and the closed position;

a carriage mounted to the clamp;

at least one upper roller rotatably supporting the carriage on the first pipe; and remotely actuable retraction means for moving the carriage and the clamp longitudinally away from the hubs after the clamp has moved to the open position, to allow disconnection of the pipes from each other.

11. The apparatus according to claim 10, further comprising:

sensing means for determining whether the clamp is fully in the open position, and for automatically preventing the retraction means from operating unless such has occurred.

12. The apparatus according to claim 10, further comprising:

temperature sensing means for monitoring the temperature of the pipes in the vicinity of the hubs and for preventing the drive member from opening the clamp if the temperature is above a selected temperature.

13. The apparatus according to claim 10, wherein the drive member comprises a threaded rod which is rotated to open and close the clamp.

14. The apparatus according to claim 10, wherein the retraction means comprises a hydraulic cylinder having one end attached to the first pipe and another end attached to the carriage.

15. The apparatus according to claim 10, wherein:

one of the hubs has an annular box member extending past the face, defining a recess for receiving the face of the other of the hubs; and wherein the apparatus further comprises:

pipe moving means engaging one of the pipes for moving the pipes apart from each other to withdraw the face of said other of the hubs from the recess after the retraction means has retracted the carriage and the clamp.

16. The apparatus according to claim 10, wherein:

the seal is an annular metal ring which has a rib which locates between the faces and which has conical faces on an outer side which engage mating conical seal surfaces formed in the hubs adjacent the faces; and the apparatus further comprises means for retaining the seal with one of the hubs after the pipes have been disconnected.

17. The apparatus according to claim 10, further comprising:

at least one lower roller rotatably mounted to the carriage in engagement with a lower side of the first pipe.

18. An apparatus for remotely connecting and disconnecting first and second pipes from each other, each of the pipes having a hub with a face perpendicular to a longitudinal axis and an external flange having a conical shoulder, the apparatus comprising in combination:

a clamp having three segments pivotally mounted to each other for movement between a radially expanded open position and a radially contracted closed position, each of the clamp segments having a pair of wedge surfaces which engage the conical shoulders of the flanges to hold the faces of the hubs in abutment with each other;

a remotely actuable powered drive member for moving the clamp segments between the open position and the closed position;

a carriage mounted to the clamp;

at least one upper roller rotatably supporting the carriage on an upper surface of the first pipe;

at least one lower roller rotatably mounted to the carriage and in engagement with a lower surface of the first pipe;

a hydraulic retracting cylinder mounted to the carriage and the first pipe for moving the carriage and the clamp longitudinally away from the abutting hubs after the clamp has moved to the open position;

pipe moving means mounted to one of the pipes for moving the hub of said one of the pipes away from the other of the pipes after the retracting cylinder has moved the clamp away from the abutting hubs, to allow disconnection of the pipes from each other; and sensing means for determining whether the clamp is fully in the open position, and for automatically preventing the retracting cylinder from operating unless such has occurred.

19. The apparatus according to claim 18, further comprising:

temperature sensing means for monitoring the temperature of the pipes in the vicinity of the hubs and for preventing the drive member from opening the clamp if the temperature is above a selected temperature.

* * * * *